United States Patent [19]
Trombe et al.

[11] 3,832,992
[45] Sept. 3, 1974

[54] NATURALLY AIR-CONDITIONED DWELLINGS

[75] Inventors: Felix Trombe, Paris; Jacques Michel, Neuilly-sur-Seine, both of France

[73] Assignee: Agence Nationale De Valorisation De La Recherche (Anvar), Courdevoie, France

[22] Filed: June 26, 1972

[21] Appl. No.: 265,989

[30] Foreign Application Priority Data
June 29, 1971 France .................... 71.23778

[52] U.S. Cl. .................... 126/270, 237/1 A
[51] Int. Cl. .................... F24j 3/02
[58] Field of Search .................... 126/270, 271; 62/2; 237/1 A

[56] References Cited
UNITED STATES PATENTS

| | | | |
|---|---|---|---|
| 2,484,127 | 10/1949 | Stelzer | 126/270 X |
| 2,559,870 | 7/1951 | Gay | 126/270 X |
| 2,601,905 | 7/1952 | Anderegg | 126/270 X |
| 2,680,565 | 6/1954 | Lof | 126/271 |
| 3,412,728 | 11/1968 | Thomason | 126/270 |
| 3,563,305 | 2/1971 | Hay | 126/270 X |

Primary Examiner—Meyer Perlin
Assistant Examiner—Ronald C. Capossela
Attorney, Agent, or Firm—Larson, Taylor & Hinds

[57] ABSTRACT

The dwelling is equipped with an installation for natural convective air conditioning comprising at least one thermal enclosure bounded by a frontage element of the dwelling exposed to solar radiation and an outer wall transparent to solar radiation and opaque to the far infrared radiation. This outer wall is arranged close to said frontage element, the top and the bottom of this thermal enclosure being able to communicate with the dwelling. The thermal enclosure has at its upper portion, first distributor means arranged to direct hot air into the dwelling or to the outer and the dwelling has a cold air inlet device provided with closure means.

17 Claims, 9 Drawing Figures

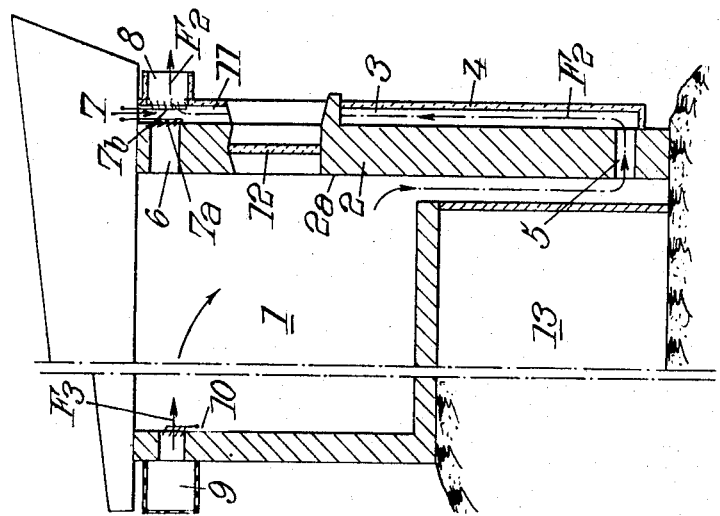
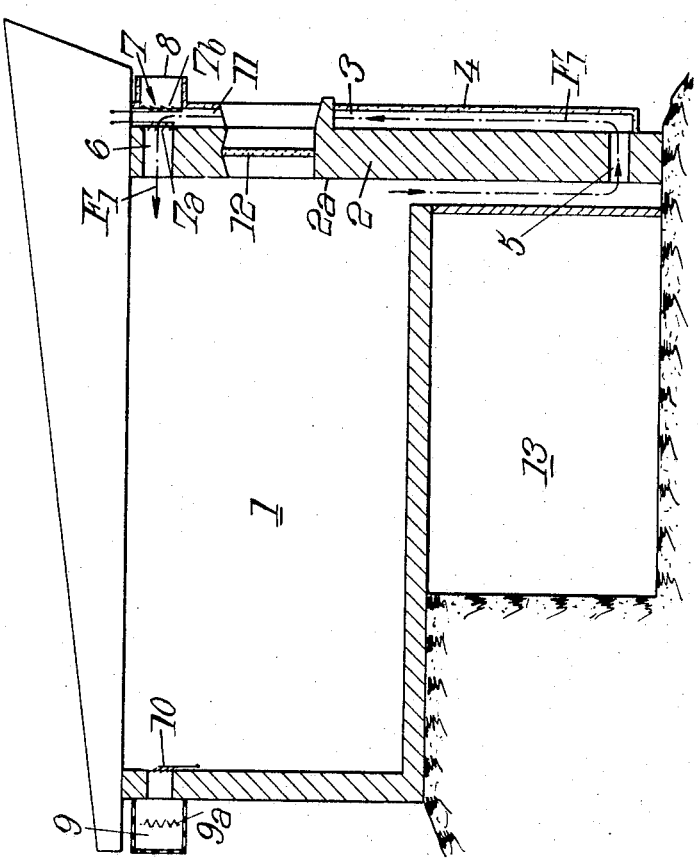

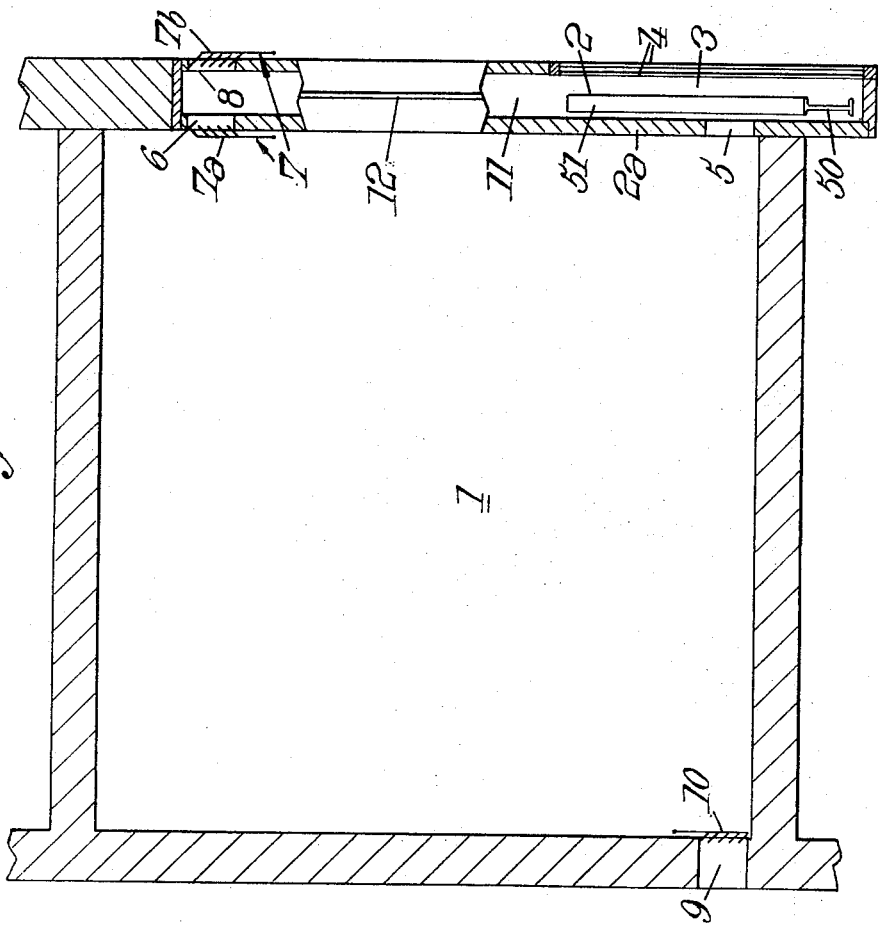
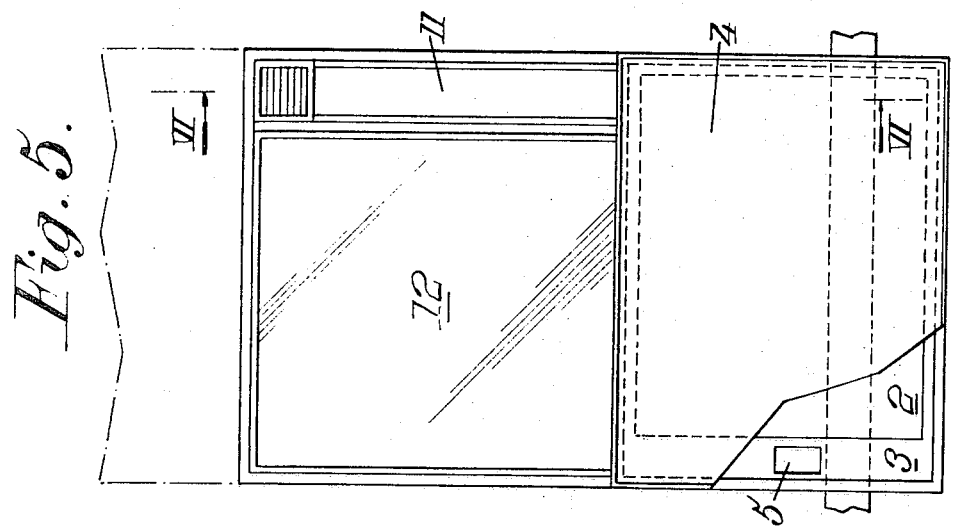

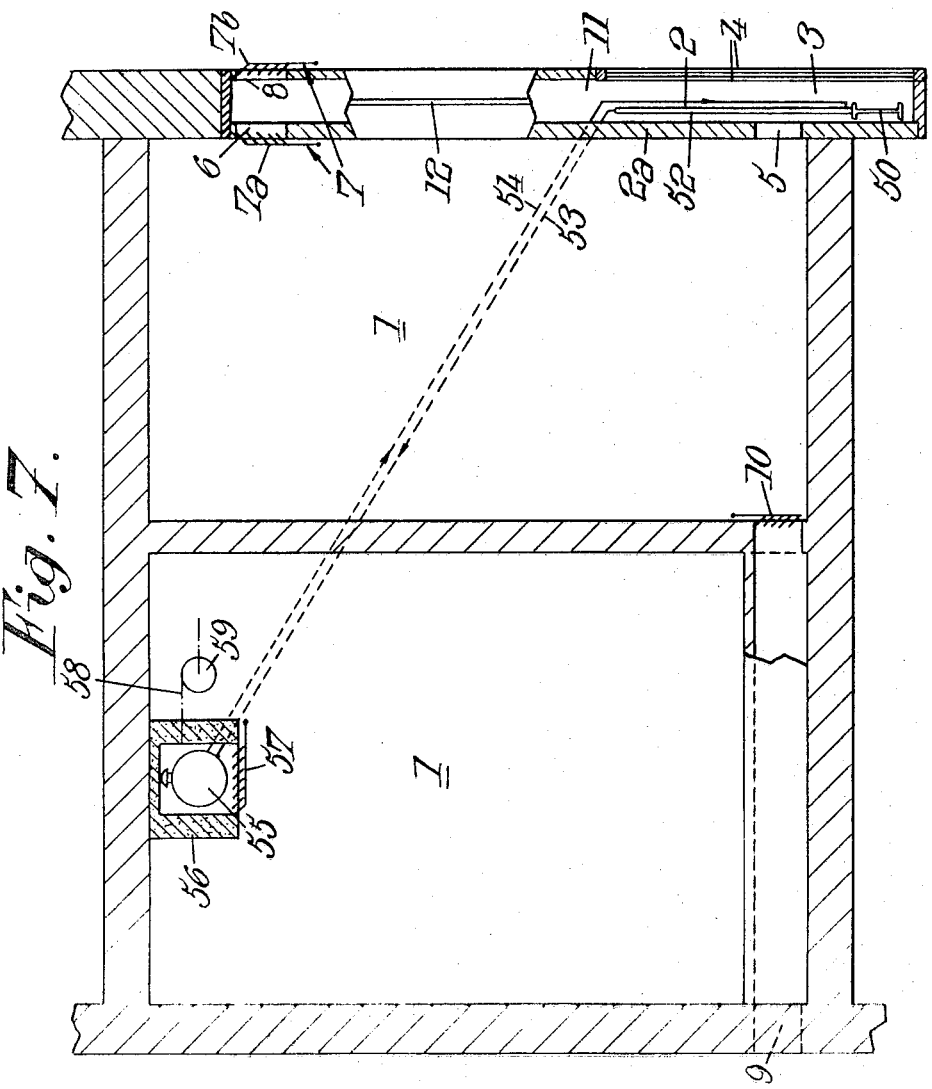

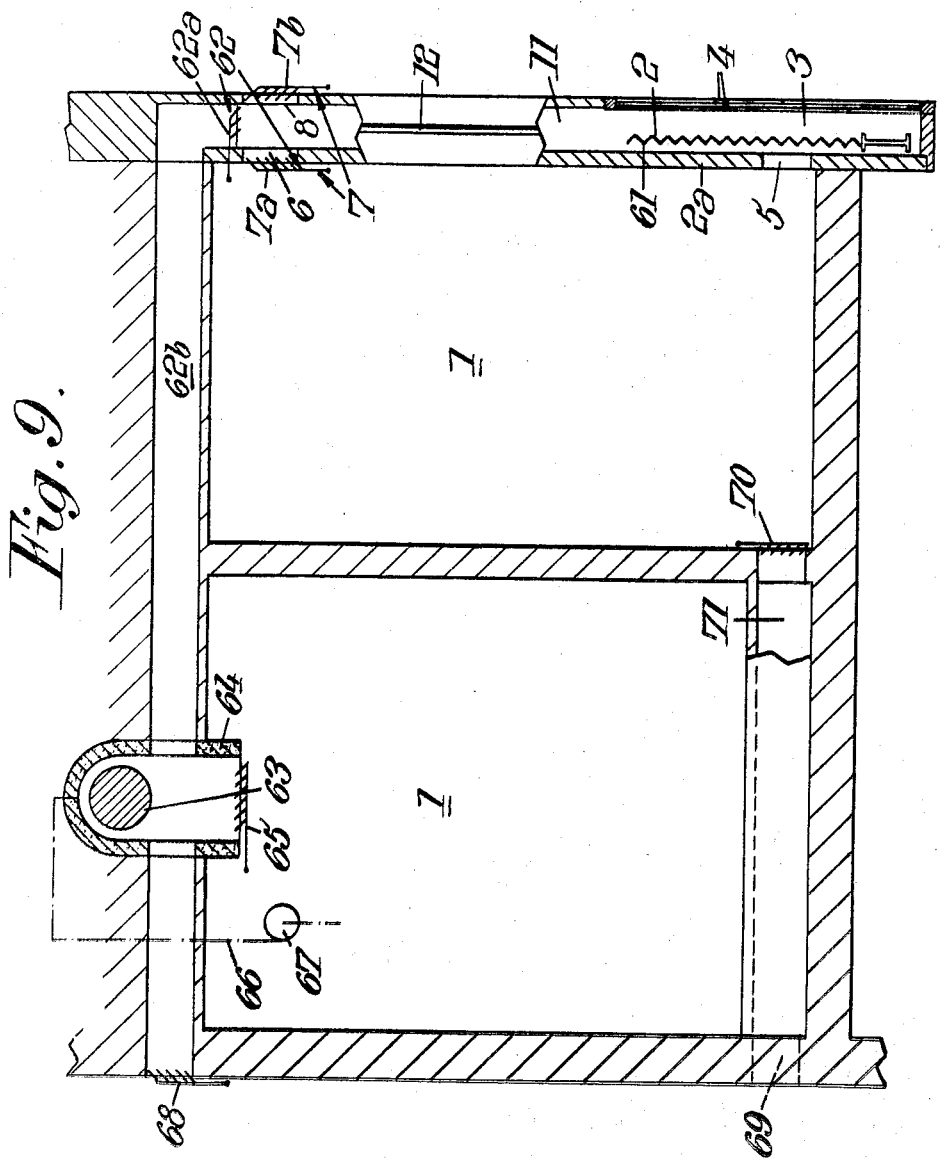

NATURALLY AIR-CONDITIONED DWELLINGS

The present invention relates to dwellings equipped with natural air conditioning installations, these installations being of the type described in French Patent No. 1,152,129 filed Mar. 1, 1956.

In this patent, there are described air conditioning installations in which the air is heated in at least one thermal enclosure mainly bounded by, on one hand, a frontage element exposed to solar radiation, and on the other hand, an outer wall transparent to solar radiation and opaque to the far infrared radiation, this outer wall being generally arranged parallel to the frontage element and close to said element, the top and the bottom of this thermal enclosure being able to communicate with the dwelling.

The air is heated in this enclosure to be then distributed in the dwelling.

However, it has been observed that in dwellings equipped with such air conditioning installations it was impossible to adjust the efficiency of the air conditioning, which constituted a considerable inconvenience in climates where the temperature differences arising during the three hot seasons (spring, summer and autumn) are large.

In addition, it posed problems due to the necessity for providing, on a same dwelling frontage, frontage elements required for the air conditioning and openings necessary for the comfort and the amenities of the dwelling.

In the absence of special precautions the circulation of air in the dwelling is effected in insufficient manner, which reduced the thermal exchanges.

It also led to habitable rooms whose volume was too large with respect to their floor surface.

It should also be pointed out that hitherto the interception and storage of the energy of solar radiation operated by means of conventional frontage elements constituted, at least to a large extent, by traditional materials, such as concrete or bricks, which led to heavy construction.

In particular many present structures are built from a frame-work in which frontage elements are arranged which cannot be constituted by traditional materials, whose weight would be prohibitive.

The present invention consists of various arrangements which can be applied independently of one another, but which can advantageously be applied in certain of their combinations, these arrangements having the object of overcoming the various above-mentioned drawbacks.

According to a first feature of the invention, on one hand, the thermal enclosure comprises in its upper portion, first distributor means arranged to direct hot air into the dwelling or to the outside, and preferably part into the dwelling, part to the outside, and on the other hand, the dwelling comprises a device for the inlet of cold air provided with closure means.

It will then be seen that when the first distributor means direct all or part of the hot air to the outside, there is produced an aspiration of cold air into the dwelling, by means of the cold air inlet device whose closure means are in a fully or partially open position.

According to a second feature of the invention, the thermal enclosure is associated with at least one reentry passage leading hot air to the top of the frontage, whence it can be distributed into the dwelling 1.

It will then be seen that it is possible to arrange in the frontage and between the one or more re-entry passages, openings such as windows, whose number and size can be conventional.

Moreover, the circulation of the hot fluid is improved to a considerable extent by the "entraining" effect achieved by the one or more re-entry passages.

According to a third feature of the invention, the frontage element comprises a closed storage space containing a liquid whose mass is sufficient to store the thermal energy resulting from the exposure of said frontage element.

Due to this arrangement there can be formed a frontage element without calling upon traditional materials, which leads, for equal efficiency of interception and of storage to economy of weight in the proportion of at least 5 to 1.

According to a fourth feature of the invention, the frontage element comprises an intercepting space containing a liquid and communicating, preferably through at least one ascending passage and through at least one descending passage, with a reserve space advantageously situated higher than said intercepting space, this reserve space being arranged to restore part at least of the thermal energy accumulated to contribute to the air conditioning of the dwelling, the total mass of the liquid contained in this intercepting space and this reserve space being sufficient to accumulate the thermal energy from the exposure of the abovesaid frontage element.

Due to this feature, not only is a light frontage element produced, but also benefit is derived from rapid heating of the thermal enclosure, and from introduction of thermal energy resulting from this restitution of the thermal energy stored in the reserve space.

According to a fifth feature of the invention, the frontage element comprises a thin and light intercepting panel, and a thermal enclosure comprises, in its upper portion, second distributor means arranged to direct hot air into the dwelling, or to a storage device arranged to store the thermal energy introduced by this air, and to restore part at least of the stored thermal energy to contribute to the air conditioning of the dwelling, these second distributor means being advantageously arranged to direct hot air, in part into the dwelling and in part to the storage device.

By means of this feature there is produced a frontage element which is particularly light and simple, and benefit is derived from rapid heating of the thermal enclosure and from introduction of thermal energy resulting from the restitution of the thermal energy storred in the storage device; moreover the hot air directed to the storage device can, after having yielded a portion of its thermal energy to said storage device, be re-ejected outside the dwelling, and thus create a circulation due to which it is possible to admit fresh air into the said dwelling, coming from the outside and admitted through an opening arranged in a wall of the dwelling not exposed to the solar radiation.

The invention will in any case be well understood with the aid of the complement of description which follows as well as of the accompanying drawings, which complement and drawings relate to preferred embodiments of the invention and do not have, of course, any limiting nature.

In the drawings:

FIG. 1 is a view in diagrammatic section of one embodiment of a dwelling according to the invention, the air conditioning installation being shown in the heating position.

FIG. 2 shows this same dwelling under the same conditions, the air conditioning installation being here shown in the cooling position.

FIG. 5 is a partial front view of another embodiment of a collective dwelling according to the invention.

FIG. 6 is a section, with part cut away, along the line VI—VI of FIG. 5.

FIG. 7 is a section, with part cut away, effected in the same place of the dwelling as the section of FIG. 6, but showing another embodiment of the invention.

FIG. 8 is a detailed view illustrating a variation of the embodiment of FIG. 7.

FIG. 9, lastly, is a section, with part cut away, effected in the same place of the dwelling as the section of FIG. 6, but showing again another embodiment according to the invention.

Figure 4:
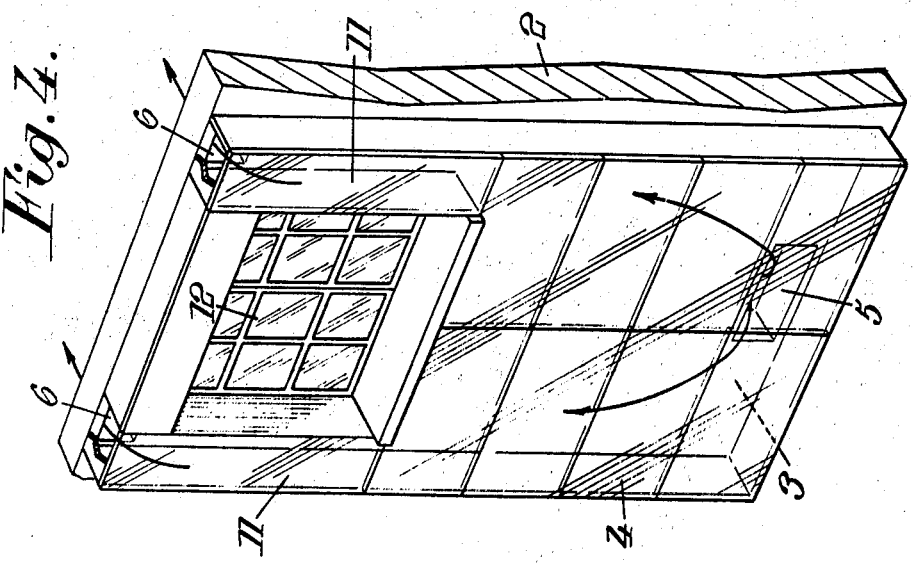
FIG. 4 is a diagrammatic perspective view of this same dwelling.
Figure 3:
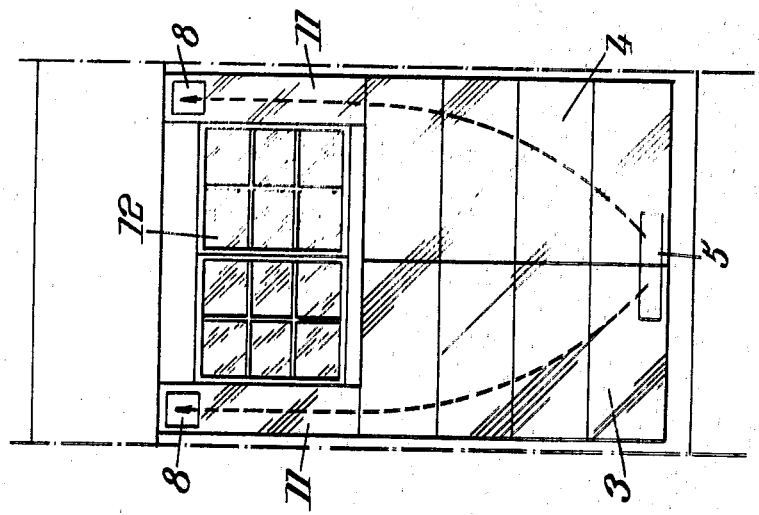
FIG. 3 is a front view, showing the dwelling illustrated in FIGS. 1 and 2.

As seen in FIGS. 1 to 7 and 9, the dwelling, denoted by the reference numeral 1, is naturally air conditioned by an installation in which the air is heated in a thermal enclosure 3, bounded by:

on one hand, a frontage element 2 constituted, for example, by a wall or a special structure, this frontage element 2 being exposed to solar radiation;

and on the other hand, an outer wall 4 transparent to solar radiation and opaque to the far infrared radiation, this outer wall 4 being arranged parallel to the frontage element 2 and close to said element.

This outer wall 4 can be formed of glass or of plexiglass transparent to radiation of wave lengths less than three microns and opaque to wave lengths greater than three microns. The frontage element 2 can have a surface with a high absorption factor for solar radiation of wave length 0.3 to 3 microns, and high radiation factor in wave lengths of 3 to 50 microns. Of course, this thermal enclosure 3 is completed by connecting walls between the outer wall 4 and the frontage element 2.

The bottom and the top of this thermal enclosure 3 can be in communication with the dwelling 1, respectively through a lower passage 5 and an upper passage 6.

According to the first feature of the invention, assumed applied in FIGS. 1 to 4 and 5 to 9, the thermal enclosure 3 comprises, in its upper portion, first distributor means 7 for directing hot air, into the dwelling 1 through the upper passage 6, or to the outside by means of an exhaust passage 8, or again in part into the dwelling 1, in part to the outside.

The dwelling 1 then comprises an inlet device 9 for cold air provided with closure means 10.

This cold air inlet means 9 is advantageously situated on a frontage element not exposed to the solar radiation. It can be constituted by a simple air intake or by a cold water trickling cooler 9a or with any other type of cooler.

These first distributor means 7 can also take a position for which they prevent the circulation of hot air to the upper passage 6 or the exhaust passage 8. The hot air then remains confined in the thermal enclosure 3, which enables the obtaining of better thermal storage in the wall element 2.

To this end, the first distributor means 7 can be constituted by shutter distributors 7a and 7b which can, if necessary, both occupy closed positions.

In FIG. 1, the first distributor means 7 are in the "heating" position (distributor with shutters 7a open, distributor with shutters 7b closed) and the circulation of the hot air is effected along the arrows $F_1$; the closure means 10 being in the "closed" position.

In FIG. 2, the first distributor means 7 are in the "cooling" position (distributor with shutters 7a closed, distributor with shutters 7b open) and the circulation of hot air is effected along the arrows $F_2$; the closure means 10 are in the "open" position and the circulation of cold air is effected along the arrows $F_3$.

The frontage element 2 advantageously has, on the side of the interior of the dwelling, thermal insulation 2a, which enables good operation after exposure to the sub.

According to the second feature of the invention, assumed applied in FIGS. 1 to 4 and 5 to 9 in combination with the first feature, the thermal enclosure 3 is associated with at least one re-entry passage 11 leading hot air to the top of the frontage, whence it is distributed by means of the first distributor means 7 to the upper passage 6 and/or the exhaust passage 8.

A structure can then advantageously be built, from modules of pre-determined width and, if necessary, height; each module being then able to comprise a thermal enclosure 3 associated with two re-entry passage 11 arranged respectively on each side of an opening 12 situated above the frontage element 2 concerned (FIGS. 3 and 4); but each module can also comprise a thermal enclosure 3 associated with a re-entry passage 11 arranged laterally with respect to an opening 12 situated above the frontage element 2 concerned (FIG. 5).

The individual dwelling shown in FIGS. 1 and 2, comprise a sub floor 13 not comprising any opening on the side of exposure to solar radiation, and the thermal enclosure 3 can be extended below the level of the dwelling.

IF, as shown in FIGS. 5 to 7 and 9, the structure of which the dwelling 1 forms part is built from a framework, able to comprise supports 50, such a structure then has a continuous frontage, or "curtain wall," which generally does not include any traditional constructional element (such as concrete or brick) whose weight would be prohibitive.

According to the third feature of the invention, as seen applied in FIGS. 5 and 6, in combination with the first and second features, the frontage element 2 comprises a storage space 51, closed, containing a liquid whose mass is sufficient to store the thermal energy resulting from the exposure of the frontage elements 2 thus constituted.

Advantageously this liquid can be constituted by water or by a mixture of water and anti-gel.

According to the fourth feature of the invention, assumed applied in FIG. 7 in combination with the first and second features, the frontage element 2 comprises an intercepting space 52 containing a liquid and communicating through an ascending passage 53 and through a descending passage 54 with a reserve space 55 situated higher than said intercepting space 52.

This reserve space 55 is arranged to restore part at least of the accumulated thermal energy to contribute to the air conditioning of the dwelling 1, the total mass of the liquid contained in the intercepting space 52 and in the reserve space 55 being sufficient to accumulate the thermal energy resulting from the exposure of the thus constituted frontage element 2.

This reserve space 55 can be situated in a room of the dwelling 1 not exposed to solar radiation.

To obtain the restitution of part at least of the thermal energy accumulated in the reserve space 55, this reserve space 55 can be arranged in a caisson 56 constituted of insulating material and whose lower part is provided with a closure device 57, for example of the shutter type. During the period when the reserve space 55 stores thermal energy, the closure device 57 is closed, whilst during the period when the said reserve space 55 must restore thermal energy, this closure device 57 is opened.

For the dwelling shown in FIG. 7, the restitution of thermal energy is obtained by forced circulation of air around the reserve space 55, this forced air circulation being generated through a circuit 58 including a blower 59.

However, it is also possible to resort to the modification of FIG. 8 according to which the restitution of energy is obtained by radiation, the inner wall of the caisson 56 being covered with a reflecting material 60, such as for example aluminium foil; it is then advantageous to give the inner wall of the caisson 56, a curved shape adapted to reflect to the infrared readiation along a maximum solid angle.

According to the fifth feature of the invention, assumed applied in FIG. 9 in combination with the first and second features, the frontage element 2 comprises a thin and light intercepting panel 51, such as for example the panel of anodised aluminium or coated with a black absorbant layer.

Under these conditions the thermal enclosure 3 comprises, at its upper part, second distributor means 62 arranged to direct hot air into the dwelling 1 or to a storage device 63 arranged to store the thermal energy introduced by this air, and to restore part at least of the thermal energy accumulated to contribute to the air conditioning of the dwelling 1, these second distributor means 62 being also able to be arranged to direct hot air, in part into the dwelling 1 and in part to the storage device 63.

This storage device 63 can be situated in a room of the dwelling 1 not exposed to solar radiation and connected to the second distributor means 62 through a passage 62b opening below said storage device 63.

This storage device 63 comprises a mass having a high thermal capacity and it can be constituted by a liquid contained in a reservoir or simply by a massive solid element.

To obtain the restoration of part at least of the heat energy accumulated in the storage device 63, this storage device 63 can be arranged in a caisson 64 constituted of insulating material and of which the part opening in the room concerned is provided with a closure device 65, for example of the shutter type. During the period when the storage device 63 stores heat energy, the closure device 65 is closed, whilst during the period when the said storage device 63 must restore heat energy, this closure device 65 is open.

For the dwelling shown in FIG. 9, the restitution of the heat energy is obtained by a forced air circulation around the storage device 63, this forced air circulation being generated by a circuit 66 including a blower 67.

However, recourse could be had to a modification, not shown, and according to which the restitution of energy would be obtained by radiation.

According to the second feature of the invention, the hot air directed to the storage device 63 can, after having yielded a part of its heat energy to the said storage device 63, be re-ejected outside the dwelling 1 through a closable opening 68, for example of the shutter type.

There is thus created a circulation due to which it is possible to admit the fresh air into the dwelling 1, said air coming from the outside and admitted through an opening 69 formed in a wall of the dwelling not exposed to solar radiation. This opening 69 is provided with a closure device 70, for example of the shutter type, and by means of a passage 71 it enables the admission of fresh air into a room of the dwelling to be cooled, such as a room of the dwelling exposed to the solar radiation.

However, there could also, according to a modification of the invention not shown, be introduced air having yielded a portion of its heat energy to the storage device 63 in a room of the dwelling where this air would contribute, due to the residual heat energy, to ensuring a certain amount of heating.

With regard to FIG. 9, it is pointed out that the first distributor means 7 are advantageously combined with the second distributor means 62, and the assembly of these distributor means comprises then, at the top of the re-entry passage 11, shutter distributors 7a and 7b enabling air to be directed respectively to the inside of the dwelling 1 or to the outside, and a shutter distributor 62a which enables air to be directed to the storage device 63.

It is now convenient, to illustrate better the advantage of the third, fourth and fifth the features of the invention, to give the following indications.

In a temperate zone of the globe, and for an exposure to the south (northern hemisphere) or an exposure to the north (southern hemisphere) it can be considered that at the maximum the heat intake due to solar radiation varies, according to the season, from 5,000 k.cal/m$^2$/day to 1,300 k.cal/m$^2$/day.

If a frontage element is regarded as being able to possess an active intercepting surface of 2m$^2$ (structures formed from modules of 1m80 width and 3m height, like the module illustrated in FIG. 5) this amounts therefore to from 6,000k cal/day/module to 1,600 k cal/day/module.

If the third feature of the invention is adopted, consisting of making the frontage element 2 comprise a storage space 51 containing water or a mixture of water and anti-gel, it may be considered that this liquid is initially at a temperature of 20°C and reaches, at the end of the period of exposure to solar radiation, 80°C; which is then calculated under these conditions that if the thermal enclosure 3 is closed 100 litres of this liquid are necessary to store these 6,000 k cal/day.

From the constructional point of view, the storage space 51 can therefore have the following dimensions: 150 cm wide, 120 cm high and 60 cm thickness.

A conventional frontage element having the same storage capacity and formed for example of concrete would weight at least 700 kg; by means of the invention therefore an economy in weight is achieved in the ratio of 7 to 1.

If the fourth feature of the invention is adopted, consisting of making the frontage element 2 comprise an intercepting space 52 containing water or a mixture of water and anti-gel, it may be considered, as previously, that this liquid is initially at a temperature of 20°C and rapidly reaches, given the small mass contained in the intercepting space, a temperature of 80° in the course of exposure to solar radiation.

Between the liquid issuing from this intercepting space 52 through the ascending passage 53 and the liquid brought back into this intercepting space 52 through the descending passage 54, there exists a temperature difference of 60°C which gives a theoretical speed of circulation of the liquid of 60 cm/second, and a practical speed of circulation of the order of 10 cm/second is therefore allowable, taking into account the various pressure losses.

Assuming a dimension of the ascending and descending passages 53 and 54 of the order of 1cm as regards their diameter, it can be calculated that the transport of heat energy is of the order of 2,000 k cal/hour, which is easily sufficient to remove the thermal energy of solar radiation which, for a duration of exposure of 5 hours is at the maximum 600 k cal/m$^2$/hour, namely 1200 k cal/hour for a dimension of 2m$^2$ for the intercepting space 52.

If the fifth feature of the invention is adopted, consisting of making the frontage element 2 comprise an intercepting panel 61, the air contained in the thermal enclosure 3 is heated in an almost instantaneous manner and it is brought to a temperature level which depends essentially on the value of the solar radiation which it receives, this air being able, as previously indicated, to be directed either into the dwelling 1 or to the storage device 63.

From the constructional point of view the "curtain wall" according to the third, fourth and fifth features of the invention has a quite normal thickness.

In fact, such a "curtain wall" comprises from the inside to the outside the following components:

An internal insulation 2a whose thickness can be from 6 to 10 cm, the frontage element 2 formed according to one of the three above-indicated features and which has at maximum a thickness of 6 cm, the thermal enclosure 3 whose thickness is about 10 cm to permit good air circulation, and the outer wall 4, constituted for example of triple glass (Triver), which has, reinforcements included, a thickness of the order of 4cm.

There is thereby produced a "curtain wall" which has a thickness of 26 to 30 cm.

Finally, due to the improvements according to the invention, the dwelling has a certain number of advantages, among which the following may be mentioned:

the hot air can be confined within the thermal enclosure, which enables a better storage of heat energy to be achieved in the frontage element, if the diurnal heating is sufficient, either by reason of the outer ambient temperature, or by the direction intervention of solar radiation penetrating through the openings situated to the south;

when the hot air is removed to the outside, the heat enclosure operates then as an aspirating device and causes an intake of cold air into the one or more rooms of the dwellings;

due to the thermal insulation provided on the inner surface of the frontage element, it is possible to preserve the role of aspirating device of the thermal enclosure well after the end of the exposure to solar radiation, hence after sunset and during the night, the air conditioning by admission of cold air being hence prolongable well beyond this period of exposure to solar radiation;

the positioning of the thermal enclosures and of the frontage elements below openings enables the said openings to be arranged in a quite conventional manner, the visibility to the South being hence entirely preserved;

this feature of the thermal enclosures also enables the height of the rooms of the dwelling to be adjusted to a normal value, which enables the surface occupied by said thermal enclosures to be reduced whilst preserving a favourable ratio between the volume of the dwelling and the surface of the corresponding frontage element, this ratio being able to be equal to 0.16 when said volume is expressed in m$^2$ and said surface in m$^2$;

the thermal insulation provided on the inner surface of the frontage element enables the introduction of heat into the dwelling to be avoided during hot periods;

the positioning of the thermal enclosures lends itself to various architectural possibilities amoung which maybe mentioned the production of supporting frontages, frontages extended downwardly for structures on sloping ground, frontages forming a "curtain wall" for storied structures;

the exploitation of the whole height of the storey being profitably applied by means of the re-entry passages forming a chimney, there is obtained a considerable increase in the pressure causing the air circulation;

this circulation is hence increased and the yield of the thermal enclosures is improved;

in a hot period, the volume of the air aspirated into the dwelling, and consequently the volume of cold air admitted into the dwelling, is also increased;

the frontage element ensuring the interception and, if necessary, the storage of the energy of the solar radiation, is particularly light and of little bulk;

the efficiency of storage of the energy of the solar radiation is increased by arranging, inside the dwelling, a reserve space or a storage device of large storage capacity;

the rooms not exposed to solar radiation can be air conditioned.

We claim:

1. Dwelling equipped with an airconditioning installation comprising a living space, at least one thermal enclosure, a frontage element of the dwelling exposed to solar radiation and an outer wall transparent to solar radiation and opaque to the far infrared radiation defining said thermal enclosure, said outer wall being arranged close to said frontage element, passage means arranged to make the top and the bottom of this thermal enclosure communicable with the living space, first distributor means arranged to direct hot air from the thermal enclosure optionally to one at least of the living space and the outside, and a cold air inlet device provided with closure means arranged in a wall exposed to no more than minimal solar radiation to admit cold air into the living space, the air thereby circulating by natural convection and, when directed from the thermal enclosure to the outside, causing aspiration of cold air into the living space through said cold air inlet.

2. Dwelling according to claim 1, wherein the first distributor means are also adapted to direct hot air partly into the living space and partly to the outside.

3. Dwelling according to claim 1, wherein the thermal enclosure is extended below the level of the dwelling.

4. Dwelling according to claim 1, wherein the frontage element comprises internal insulation.

5. Dwelling equipped with an air conditioning installation comprising a living space, at least one thermal enclosure, a frontage element of the dwelling exposed to solar radiation and an outer wall transparent to solar radiation and opaque to the far infrared defining said thermal enclosure, said outer wall being arranged close to said frontage element, passage means arranged to make the top and the bottom of this thermal enclosure communicable with the living space, the thermal enclosure being associated with at least one re-entry passage, leading hot air to the top of the frontage element, whence it can be distributed in the living space, said dwelling being constructed from modules each comprising a thermal enclosure associated with at least one passage arranged laterally with respect to an opening, said opening being situated above said thermal enclosure.

6. Dwelling according to claim 5, constructed from modules each comprising a thermal enclosure associated with two passages arranged on both sides of an opening situated above the frontage element concerned.

7. Dwelling equipped with an air conditioning installation comprising a living space, at least one thermal enclosure, a frontage element for the dwelling exposed to solar radiation and an outer wall transparent to solar radiation and opaque to the far infrared defining said thermal enclosure, said outer wall being arranged close to said frontage element, passage means arranged to make the top and the bottom of this thermal enclosure able to communicate with the living space, first distributor means arranged to direct hot air from the thermal enclosure optionally to one at least of the living space and the outside cold air inlet means for the living space, the air thereby circulating by natural convection and, when directed from the thermal enclosure to the outside, causing aspiration of cold air into the living space through said cold air inlet means wherein the frontage element comprises a closed storage space containing a liquid whose mass is sufficient to accumulate the thermal energy resulting from the exposure of said frontage element.

8. Dwelling according to claim 7, wherein the liquid contained in the storage space comprises water.

9. Dwelling equipped with an air conditioning installation comprising a living space, at least one thermal enclosure, a frontage element of the dwelling exposed to solar radiation and an outer wall transparent to solar radiation and opaque to far infrared radiation defining said thermal enclosure, said outer wall being arranged close to aid frontage element, passage means arranged to make the top and the bottom of this thermal enclosure able to communicate with the living space, first distributor means arranged to direct hot air from the thermal enclosure optionally to one at least of the living space and the outside cold air inlet means for the living space, the air thereby circulating by natural convection and, when directed from the thermal enclosure to the outside, causing aspiration of cold air into the living space through said cold air inlet means; wherein the frontage element comprises an intercepting space containing a liquid and communicating with a reserve space arranged to restore part at least of the stored thermal energy to contribute to the air conditioning of the dwelling, the total mass of liquid contained in this intercepting space and this reserve space being sufficient to store the thermal energy resulting from the exposure of this frontage element.

10. Dwelling according to claim 9, wherein the reserve space is situated above the intercepting space, the communication between the intercepting space and the reserve space being effected through at least one ascending passage and at least one descending passage.

11. Dwelling according to claim 9, wherein the reserve space is arranged in a room of the dwelling exposed to no more than minimal solar radiation.

12. Dwelling according to claim 9, wherein the reserve space restores its thermal energy by forced circulation of air around said reserve space.

13. Dwelling according to claim 9, wherein the reserve space restores its thermal energy by radiation.

14. Dwelling equipped with an air conditioning installation comprising a living space, at least one thermal enclosure, a frontage element for the dwelling exposed to solar radiation and an outer wall transparent to solar radiation and opaque to the far infrared radiation defining said thermal enclosure, said outer wall being arranged close to said frontage element, passage means arranged to make the top and the bottom of this thermal enclosure able to communicate with the living space, wherein the frontage element comprises a thin, light intercepting panel and the thermal enclosure comprises in its upper portion, first distributor means arranged to direct hot air from the thermal enclosure optionally to one at least of the living space and the outside cold air inlet means for the living space, the air thereby circulating by natural convection and, when directed from the thermal enclosure to the outside, causing aspiration of cold air into the living space through said cold air inlet means, second distributor means arranged to direct hot air optionally to one at least of the living space and to a storage device arranged to store the thermal energy introduced by this air, and to restore part at least of the stored thermal energy to contribute to the air conditioning of the dwelling.

15. Dwelling according to claim 14, wherein the second distributor means are also arranged to direct hot air, partly into the living space, partly to the storage device.

16. Dwelling according to claim 14, wherein the hot air directed to the storage device is then re-ejected outside the dwelling, at least one opening provided with a closure device being arranged in a non-exposed wall of this dwelling.

17. Dwelling according to claim 14, wherein the hot air directed to the storage device is then re-ejected to a room of the dwelling to introduce therein its residual thermal energy.

* * * * *